United States Patent
Mizusaki et al.

(10) Patent No.: US 8,654,290 B2
(45) Date of Patent: Feb. 18, 2014

(54) LIQUID CRYSTAL DISPLAY DEVICE

(75) Inventors: Masanobu Mizusaki, Osaka (JP); Tadashi Ohtake, Osaka (JP); Takashi Katayama, Osaka (JP); Masako Nakamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 71 days.

(21) Appl. No.: 13/148,762

(22) PCT Filed: Feb. 12, 2010

(86) PCT No.: PCT/JP2010/000878
§ 371 (c)(1),
(2), (4) Date: Aug. 10, 2011

(87) PCT Pub. No.: WO2010/131392
PCT Pub. Date: Nov. 18, 2010

(65) Prior Publication Data
US 2011/0310319 A1    Dec. 22, 2011

(30) Foreign Application Priority Data
May 15, 2009    (JP) ................................. 2009-118530

(51) Int. Cl.
*G02F 1/1337* (2006.01)
*G02F 1/141* (2006.01)
*G02F 1/1335* (2006.01)

(52) U.S. Cl.
USPC ............................. 349/127; 349/96; 349/135

(58) Field of Classification Search
USPC ................... 349/96, 127, 132, 135
See application file for complete search history.

(56) References Cited

U.S. PATENT DOCUMENTS

| | | | |
|---|---|---|---|
| 5,725,915 A | 3/1998 | Ishitaka et al. | |
| 6,686,980 B1 | 2/2004 | Ichihashi | |

(Continued)

FOREIGN PATENT DOCUMENTS

| | | |
|---|---|---|
| GB | 2 315 903 | 2/1998 |
| JP | 56-138715 | 10/1981 |
| JP | 8-95047 | 4/1996 |
| JP | 10-161105 | 6/1998 |
| JP | 2001-133630 | 5/2001 |
| JP | 2003-177418 | 6/2003 |
| JP | 2006-91393 | 4/2006 |
| JP | 2006-522955 | 10/2006 |
| JP | 2010-72521 | 4/2010 |

OTHER PUBLICATIONS

International Search Report for PCT/JP2010/000878, mailed Apr. 20, 2010.
English Translation of the Written Opinion for PCT/JP2010/000878, 2 pages.

*Primary Examiner* — Edward Glick
*Assistant Examiner* — Dennis Y Kim
(74) *Attorney, Agent, or Firm* — Nixon & Vanderhye P.C.

(57) ABSTRACT

A liquid crystal display device (1) includes a first substrate (2), a second substrate (3) provided to face the first substrate (2), a liquid crystal layer (4) sandwiched between the first substrate (2) and the second substrate (3), a first polarizing plate (5) and a second polarizing plate (6) respectively provided on a side of the first substrate (2) and a side of the second substrate (3) which are opposed to sides to which the liquid crystal layer (4) is provided, and a common electrode (7) and a pixel electrode (9) provided to the liquid crystal layer (4) side of the first substrate (2). Alignment of liquid crystal molecules (4a) of the liquid crystal layer (4) is controlled by an electric field generated between the common electrode (7) and the pixel electrode (9). A polarizing layer (13) is provided on the liquid crystal layer (4) side of the second substrate (3) so as to be in contact with the liquid crystal layer (4). The polarizing layer (13) has a uniaxial absorption anisotropy, and serves as an alignment layer for regulating a direction of alignment of the liquid crystal molecules (4a).

2 Claims, 6 Drawing Sheets

(56) References Cited

U.S. PATENT DOCUMENTS

| | | | |
|---|---|---|---|
| 8,345,201 B2* | 1/2013 | Mizusaki et al. | 349/135 |
| 2002/0163616 A1* | 11/2002 | Jones et al. | 349/187 |
| 2003/0086044 A1 | 5/2003 | Inoue et al. | |
| 2004/0201795 A1 | 10/2004 | Paukshto | |
| 2005/0140904 A1* | 6/2005 | Choi | 349/141 |
| 2006/0066788 A1 | 3/2006 | Utsumi et al. | |
| 2007/0115412 A1* | 5/2007 | Tsuchiya et al. | 349/117 |
| 2008/0158499 A1* | 7/2008 | Lai et al. | 349/162 |
| 2008/0252824 A1* | 10/2008 | Kadowaki et al. | 349/96 |
| 2010/0073609 A1 | 3/2010 | Matsumori et al. | |

* cited by examiner

LIQUID CRYSTAL DISPLAY DEVICE

This application is the U.S. national phase of International Application No. PCT/JP2010/000878 filed 12 Feb. 2010, which designated the U.S. and claims priority to Japan Application No. 2009-118530, filed 15 May 2009, the entire contents of each of which are hereby incorporated by reference.

TECHNICAL FIELD

The present invention relates to liquid crystal display devices, and specifically relates to in-plane mode liquid crystal display devices.

BACKGROUND ART

For example, Twisted Nematic (TN) mode liquid crystal display devices using nematic liquid crystals have been utilized. The TN mode liquid crystal display device includes a pair of substrates facing each other, and a liquid crystal layer interposed between the substrates, and is configured to drive the liquid crystal layer by generating an electric field between electrodes provided to the respective substrates. That is, the liquid crystal molecules of the liquid crystal layer are switched to point the substrates, depending on the presence or absence of the electric field between the substrates. However, the TN mode liquid crystal display devices have problems such as a slow response speed and a narrow viewing angle.

In view of this, in-plane mode liquid crystal display devices are known in which a pixel electrode and a common electrode are formed on the same substrate; a voltage is applied between the pixel electrode and the common electrode, thereby generating an electric field parallel to a substrate surface and driving the liquid crystal molecules in a plane parallel to the substrate surface.

In-Plane Switching (IPS) mode and Fringe Field Switching (FFS) mode are known as this in-plane mode. According to the IPS mode, to prevent the generation of display unevenness and reduce necessary voltages, a fine-toothed pixel electrode and a fine-toothed common electrode are combined and placed. According to the FFS mode, a pixel electrode and a common electrode for applying an electric field to a liquid crystal layer are located on different layers, with insulating films respectively interposed therebetween.

Here, these in-plane mode liquid crystal display devices have a problem in which thermal fluctuations of the liquid crystal molecules in the liquid crystal layer occur, and a contrast ratio is reduced due to the thermal fluctuations.

In view of this, to prevent a reduction in the contrast ratio, liquid crystal display devices including a polarizing layer are suggested. More specifically, a liquid crystal display device is disclosed which includes a pair of substrates, a pair of polarizing plates respectively placed on the pair of substrates, a liquid crystal layer sandwiched between the pair of substrates, an alignment film for aligning liquid crystal molecules in a predetermined direction, a pixel electrode and a common electrode formed at least one of the pair of substrates, for applying an electric field to the liquid crystal layer, and a polarizing layer having a uniaxial absorption anisotropy between the pair of polarizing plates. With this structure, it is possible to reduce a chromaticity change in a white representation and a black representation, and reduce luminance of the black representation to improve a contrast ratio (see, e.g., Patent Document 1).

Further, liquid crystal display devices are suggested which include two substrates facing each other, a liquid crystal layer interposed between the two substrates, an alignment film for aligning liquid crystal molecules in a predetermined direction, a color filter layer formed on at least one of the two substrates, and a polarizing layer located between the color filter layer and the liquid crystal layer, for compensating for depolarization of linearly polarized light in the color filter layer. The polarizing layer is a coating of molecules which are aligned and polymerized. With this structure, depolarization of linearly polarized light in the color filter layer is compensated, thereby reducing scattering of the depolarized light, and decreasing light transmission in the dark state. Consequently, a reduction in contrast ratio can be prevented (see, e.g., Patent Document 2).

CITATION LIST

Patent Document

PATENT DOCUMENT 1: Japanese Patent Publication No. 2006-91393
PATENT DOCUMENT 2: Japanese Patent Publication No. H10-161105

SUMMARY OF THE INVENTION

However, the above conventional liquid crystal display devices had a problem in which if there is a small misalignment between a direction of a transmission axis of the polarizing layer provided inside the liquid crystal display device and a direction of alignment of the liquid crystal molecules, light use efficiency is reduced, thereby causing a reduction in luminance, and as a result, the contrast ratio decreases.

Further, the above conventional liquid crystal display devices need to be provided with a polarizing layer in addition to an overcoat layer which is provided, for planarization, on an alignment layer or a color filter layer. Therefore, the liquid crystal display devices might have a complicated structure, and the number of the fabrication steps might be increased, resulting in an increase in cost.

The present invention was made in view of the above problems, and it is an objective of the invention to provide a liquid crystal display device with an improved contrast ratio and less fabrication steps to prevent a cost increase.

To solve the above problems, a liquid crystal display device of the present invention includes: a first substrate; a second substrate provided to face the first substrate; a liquid crystal layer sandwiched between the first substrate and the second substrate; a first polarizing plate and a second polarizing plate respectively provided on a side of the first substrate and a side of the second substrate which are opposed to sides to which the liquid crystal layer is provided; and a first electrode and a second electrode provided to the liquid crystal layer side of the first substrate, wherein an electric field parallel to substrate surfaces of the first and second substrates is applied to the liquid crystal layer by an electric field generated between the first electrode and the second electrode, thereby controlling alignment of liquid crystal molecules of the liquid crystal layer. A polarizing layer is provided on the liquid crystal layer side of the second substrate so as to be in contact with the liquid crystal layer, and the polarizing layer has a uniaxial absorption anisotropy and serves as an alignment layer for regulating a direction of alignment of the liquid crystal molecules.

According to this structure, the polarizing layer having a uniaxial absorption anisotropy is in contact with the liquid crystal layer and serves as an alignment layer, and therefore, it is possible to make the direction of the transmission axis of the polarizing layer completely align with the direction of the alignment axis. Since the polarization axis of the polarizing layer completely aligns with the alignment axis of the liquid crystal molecules, it is possible to prevent leakage of light at the time of no voltage application. As a result, a reduction in contrast ratio can be prevented.

Further, since the polarizing layer serves as an alignment layer, it is not necessary to provide an alignment layer in addition to the polarizing layer. Thus, the structure of the liquid crystal display device can be simplified, and it is possible to provide the polarizing layer without an increase in the number of fabrication steps. As a result, it is possible to prevent a cost increase.

Further, in the liquid crystal display device of the present invention, the polarizing layer may serve as an overcoat layer for planarizing a surface layer of the second substrate.

According to this structure, the polarizing layer serves as an overcoat layer. Therefore, it is possible to use an unpolished second substrate having undulations in the form asperities on the surface. This means that it is not necessary to provide a work process for the second substrate. Thus, it is possible to reduce the number of fabrication steps and reduce cost.

Further, it is not necessary to provide an overcoat layer in addition to the polarizing layer. Thus, the structure of the liquid crystal display device can be more simplified, and it is possible to provide the polarizing layer serving as an overcoat layer without increasing the number of fabrication steps. As a result, it is possible to further prevent an increase in cost.

Further, in the liquid crystal display device of the present invention, the polarizing layer may contain anisotropic absorbers, and the anisotropic absorbers may be aligned in one direction by irradiation with linearly polarized light.

According to this structure, it is possible to form the polarizing layer in a simple structure which has a uniaxial absorption anisotropy and which can serve as an alignment layer.

Further, in the liquid crystal display device of the present invention, the anisotropic absorbers may be an azo-based compound or an anthraquinone-based compound.

According to this structure, it is possible to form the polarizing layer which has a uniaxial absorption anisotropy and which serves as an alignment layer, using a cheap, general-purpose compound.

Further, in the liquid crystal display device of the present invention, a glass transition temperature of the polarizing layer may be 200° C. or more.

According to this structure, it is possible to prevent occurrence of image sticking caused by a change in the direction of alignment of the liquid crystal molecules aligned by the polarizing layer which serves as an alignment layer.

Further, in the liquid crystal display device of the present invention, a polymer forming the polarizing layer may be at least one selected from a group consisting of a polyimide-based resin, a polyamic acid imide-based resin, a polyimide siloxane-based resin, and a polyamid imide-based resin.

According to this structure, it is possible to form the polarizing layer which has a uniaxial absorption anisotropy and which serves as an alignment layer, using a cheap, general-purpose compound.

Further, in the liquid crystal display device of the present invention, a weight average molecular weight of the polymer forming the polarizing layer may be 10000 or more and 300000 or less.

According to this structure, it is possible to sufficiently increase the glass transition temperature of the polarizing layer without causing any problems such as difficulty in depositing the polarizing layer and difficulty in uniaxially aligning the anisotropic absorbers.

Further, in the liquid crystal display device of the present invention, the polarizing layer may be made of an acrylic polymer obtained by polymerizing a bifunctional acrylic monomer.

According to this structure, the acrylic polymer forming the polarizing layer is bifunctional. Therefore, it is possible to prevent variations in direction of alignment of the liquid crystal molecules, and possible to prevent a reduction of the contrast ratio. Further, since it is possible to prevent the liquid crystal molecules from having a tilt angle of larger than 0°, it is possible to prevent a reduction in luminance.

Further, the glass transition temperature of the bifunctional acrylic polymer is higher than the glass transition temperature of the monofunctional acrylic polymer. Thus, the bifunctional acrylic polymer is superior in long term stability, and as a result, a reduction in contrast ratio and a reduction in luminance can be avoided.

Further, in the liquid crystal display device of the present invention, an alignment maintaining layer for maintaining alignment of the liquid crystal molecules may be provided on each of a first substrate side surface and a second substrate side surface of the liquid crystal layer.

According to this structure, alignment of the liquid crystal molecules can be maintained with reliability. Thus, the problem in which an initial azimuth angle gradually shifts due to an effect of voltage does not occur. Further, the provision of the alignment maintaining layer can completely prevent the shift of the initial azimuth angle. Thus, it is possible to significantly improve the durability of the liquid crystal display device.

Further, in the liquid crystal display device of the present invention, the alignment maintaining layer may be formed by polymerizing a polymerizable monomer contained in the liquid crystal layer.

According to this structure, polymerizable monomers in the liquid crystal layer are, for example, irradiated with ultraviolet light (or is subjected to a heat treatment) to polymerize the polymerizable monomers, thereby making it possible to form an alignment maintaining layer. Consequently, the alignment maintaining layer can be formed by a simple method.

Further, in the liquid crystal display device of the present invention, a transmission axis of the polarizing layer may be orthogonal to a transmission axis of the first polarizing plate, and is in a same direction as a direction of a transmission axis of the second polarizing plate.

According to a liquid crystal display device of the present invention, it is possible to prevent a reduction in contrast ratio, and reduce the number of fabrication steps, thereby preventing a cost increase.

DESCRIPTION OF EMBODIMENTS

Embodiments of the present invention will be described in detail hereinafter based on the drawings. The present invention is not limited to the following embodiments.

First Embodiment

Figure 1:
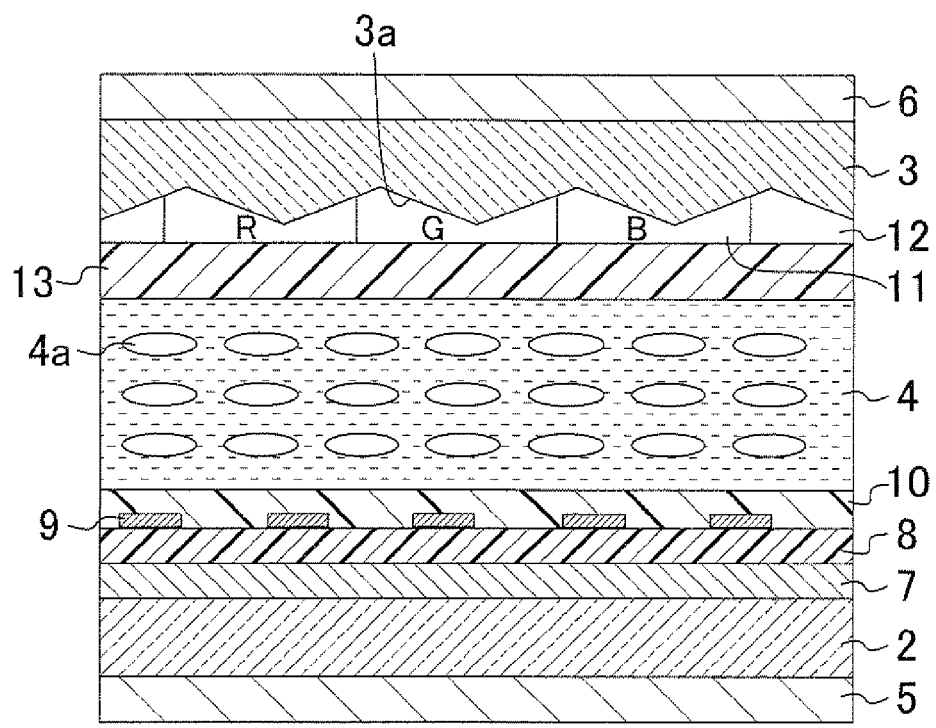
FIG. 1 is a cross section of a liquid crystal display device according to the first embodiment of the present invention.

FIG. 1 is a cross section of a liquid crystal display device according to the first embodiment of the present invention.

As shown in FIG. 1, a liquid crystal display device 1 includes a first substrate 2 having an FFS mode electrode structure, a second substrate 3 facing the first substrate 2, and a liquid crystal layer 4 that is a display medium layer sandwiched between the first substrate 2 and the second substrate 3. Further, the liquid crystal display device 1 includes a first polarizing plate 5 provided on a side of the first substrate that is opposed to a side at which the first substrate is provided, and a second polarizing plate 6 provided on a side of the second substrate 3 that is opposed to a side at which the liquid crystal layer 4 is provided. Although not shown, a back light unit is provided on the first polarizing plate 5 side.

The first substrate 2 is made, for example, of a transparent insulating substrate, such as a glass substrate. Further, a common electrode 7 as a first electrode is provided on the liquid crystal layer 4 side of the first substrate 2. The common electrode 7 is made, for example, of a transparent conductive film, such as ITO.

Further, an insulating film 8 is provided on the common electrode 7. The insulating film 8 is made of a translucent material, such as glass and plastic.

Further, a pixel electrode 9 as a second electrode is provided on the insulating film 8 on the liquid crystal layer 4 side of the first substrate 2. The pixel electrode 9, like the common electrode, is made of a transparent conductive film such as ITO.

As described, the liquid crystal display device 1 of the present embodiment has a structure in which the common electrode 7 and the pixel electrode 9 for applying an electric field to the liquid crystal layer 4 are provided in different layers, with the insulating film 8 interposed therebetween.

Further, the first substrate 2 includes a thin film transistor (TFT), not shown, as a switching element. The pixel electrode 9 is connected to the TFT via a contact hole (not shown) formed in the insulating film 8.

An in-plane electric field parallel to the substrate surfaces of the first substrate 2 and the second substrate 3 is generated between the pixel electrode 9 and the common electrode 7 by applying a voltage between the pixel electrode 9 and the common electrode 7. The electric field parallel to the substrate surfaces of the first substrate 2 and the second substrate 3 is applied to the liquid crystal layer 4, thereby controlling alignment of liquid crystal molecules 4a in the liquid crystal layer 4 within a plane parallel to the substrate surfaces of the first substrate 2 and the second substrate 3.

Further, an alignment layer 10 for regulating a direction of alignment of the liquid crystal molecules 4a is provided on the pixel electrode 9 and the insulating film 8 on the liquid crystal layer 4 side of the first substrate 2. According to the present embodiment, the alignment layer 10 is made of a polyimide resin, and is an alignment film having photo alignment properties capable of aligning liquid crystals by irradiation with linearly polarized light.

The second substrate 3 is made, for example, of a transparent insulating substrate, such as a glass substrate. As shown in FIG. 1, a color filter layer 11 and a black matrix 12 as a light-shielding film are provided on the second substrate 3. The color filter layer 11 includes pigmented layers such as a red color layer R, a green color layer G, and a blue color layer B provided for each pixel. The black matrix 12 is made, for example, of a metal material such as Ta (tantalum), Cr (chromium), Mo (molybdenum), Ni (nickel), Ti (titanium), Cu (copper), and Al (aluminum), a resin material in which black pigments, such as carbon, are dispersed, or a resin material in which pigmented layers of multiple colors that have a light transmission property are layered.

Further, according to the present embodiment, the surface of the second substrate 3 is not polished, unlike the first substrate 2.

That is, in general, the surface of a glass substrate to be used for a liquid crystal display device is not completely smooth, but has a little undulations or asperities. Thus, the surface of the glass substrate is smoothed by polishing. According to the present embodiment, the surface of the first substrate 2 is smoothed by the polishing.

Figure 2:
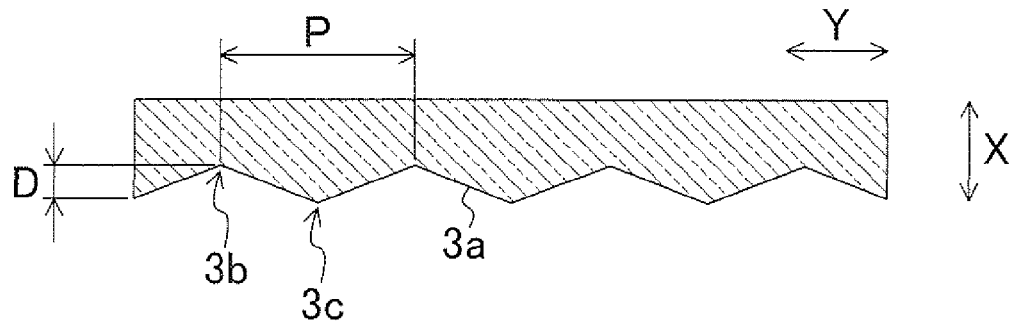
FIG. 2 is a cross section for explaining a structure of a second substrate used for the liquid crystal display device according to the first embodiment of the present invention.

On the other hand, the surface 3a of the second substrate 3 (i.e., the surface of the second substrate 3 on the color filter layer 11 side) is not polished as shown in FIG. 2, and the surface 3a of the second substrate 3 has undulations in the form of asperities. As a non-polished glass substrate used as the second substrate 3 of the present embodiment, such a glass substrate of which a maximum distance (or amplitude) D between a recess 3b and a protrusion 3c in a width direction X of the second substrate 3 is 0.5 μm, and of which a pitch P of the recess 3b (or the protrusion 3c) in a direction Y of a plane of the second substrate 3 (i.e., a direction orthogonal to the width direction X) is 10 mm can be used as shown in FIG. 2, for example.

Here, the present embodiment is characterized in including, on the liquid crystal layer 4 side of the second substrate 3, a polarizing layer 13 having a uniaxial absorption anisotropy and serving as an alignment layer for regulating a direction of alignment of the liquid crystal molecules 4a. This polarizing layer 13 is provided between the liquid crystal layer 4 and the color filter layer 11, and is in contact with the liquid crystal layer 4, as shown in FIG. 1.

Further, the polarizing layer 13 includes a polymer thin film made of a polymer, and an anisotropic absorber (an anisotropic absorbing pigment) contained in the polymer thin film.

A polyimide-based resin, a polyamic acid imide-based resin, a polyimidesiloxane-based resin, and a polyamidimide-based resin can be used as the polymer forming the polymer thin film. These resins may be solely used, or two or more of the resins may be mixed.

Further, in the present embodiment, a glass transition temperature of the polarizing layer 13 (i.e., a polymer thin film) is preferably 200° C. or more, and more preferably 300° C. or more. With this structure, it is possible to avoid occurrence of image sticking (i.e., a phenomenon in which an afterimage occurs in a display portion when a state in which a voltage is applied is changed to a state in which no voltage is applied) caused by a change in direction of alignment of the liquid crystal molecules 4a which are aligned by the polarizing layer 13 serving as an alignment layer.

The term "glass transition temperature" as used herein is a physical property of the polymer thin film that is measured by a dynamic viscoelasticity measuring apparatus (DMA).

For example, in the case where a polyimide-based resin is used, polyimide is formed using diamine and tetracarboxylic dianhydride as materials. Specifically, equal mol proportions of diamine and tetracarboxylic dianhydride are polymerized to form a polyamic acid (a polyamide acid) as a precursor of polyimide. Then, the polyamide acid is heated (or a catalyst is used) to cause dehydration and cyclization (i.e., imidization) reactions, thereby forming polyimide.

Here, in the present embodiment, the diamine and the tetracarboxylic dianhydride are selected such that the glass transition temperature of the polarizing layer 13 formed of the polyimide is 200° C. or more. Specifically, an imidization rate is set to 60% or more by heating the polyamic acid, thereby making it possible to set the glass transition temperature to 200° C. or more. As a result, the occurrence of the image sticking can be prevented.

Examples of the diamine which can be used in the present embodiment include, as aromatic diamine, p-phenylenediamine, m-phenylenediamine, 2,4-diaminotoluene, 2,5-diaminotoluene, 2,6-diaminotoluene, diaminodurene, benzidine, o-tolidine, 3,3-dimethoxybenzidine, 4,4'-diaminoterphenyl, 1,5-diamino naphthalene, 2,7-diaminofluorene, 4,10,4'-diaminodiphenyl ether, 4,4'-diamino diphenyl sulfide, 4,4'-diaminodiphenyl methane, 3,3'-dimethyl-4,4'-diaminodiphenyl methane, 2,5-diaminopyridine, 4,4'-bis(p-aminophenoxy)biphenyl, 2,2-bis{4-(p-aminophenoxy)phenyl}propane, 2,2-bis{4-(p-aminophenoxy)phenyl}hexafluoropropane, and 4,4'-bis(m-aminophenoxy)diphenyl sulfone.

Examples of the tetracarboxylic dianhydride which can be used in the present embodiment include, as aromatictetracarboxylic acid, pyromellitic acid dianhydride, methyl-pyromellitic acid dianhydride, dimethylene trimellitic acid dianhydride, 3,3',4,4'-benzophenone tetracarboxylic dianhydride, 3,3',4,4'-biphenyltetracarboxylic dianhydride, dimethylene trimellitic acid dianhydride, 2,3,6,7-naphthalene tetracarboxylic dianhydride, 3,3',4,4'-biphenyl sulfone tetracarboxylic dianhydride, 3,3',4,4'-diphenyl ether tetracarboxylic dianhydride, and 3,3',4,4'-diphenylmethane tetracarboxylic dianhydride, and include as alicyclic tetracarboxylic dianhydride, 1,2,3,4-butane tetracarboxylic dianhydride, 1,2,3,4-bis cyclobutane tetracarboxylic dianhydride, and 1,2,3,4-cyclopentane tetracarboxylic dianhydride.

Further, a polystyrene equivalent weight average molecular weight of the polymer forming the polymer thin film is preferably, but not limited to 10000 or more and 300000 or less because if the weight average molecular weight is lower than 10000, the glass transition temperature of the polarizing layer 13 may be sufficiently increased. Further, if the number average molecular weight is greater than 300000, the viscosity of a solution obtained by dissolving, for example, a polyimide-based resin in a solvent (e.g., N-methylpyrrolidone) to form the polarizing layer 13 becomes high. This makes the film deposition difficult, and the anisotropic absorbers contained in the polymer thin film may not be easily uniaxially aligned by the irradiation with light described later.

Here, the term "weight average molecular weight" as used herein is a polystyrene equivalent weight average molecular weight obtained by measuring a chloroform soluble fraction by gel permeation chromatography.

Further, the alignment layer 10 is made of a polymer thin film formed of a polymer similar to the above-described polymer forming the polarizing layer 13, and like the polarizing layer 13, the glass transition temperature is set to 200° C. or more to prevent the occurrence of the image sticking. Further, the alignment layer 10 is an alignment film having photo alignment properties capable of aligning liquid crystals by irradiation with linearly polarized light.

Further, the molecular weight distribution of the polymer forming the polymer thin film is preferably, but not limited to, 2 or less because if the molecular weight distribution is greater than 2, the polymer thin film may have an uneven thickness.

The term "molecular weight distribution" as used herein is a ratio between the weight average molecular weight and the number average molecular weight (i.e., weight average molecular weight/number average molecular weight).

Further, in the present embodiment, a linear rod-like molecule having a high uniaxial anisotropy can be used as an anisotropic absorber (an anisotropic absorbing pigment) contained in the polymer thin film forming the polarizing layer. Examples of the linear rod-like molecules having a high uniaxial anisotropy include compounds having a skeleton of azo series, anthraquinone series, polysazo series, benzidine series, diphenylurea series, stilbene series, dinaphthylamine series, or anthraquinone series, but are not limited to these compounds.

Then, the polymer thin film containing the anisotropic absorbers is heated and irradiated with linearly polarized ultraviolet light to make the anisotropic absorbers align in one direction, thereby forming the polarizing layer 13 serving as an alignment layer for regulating the direction of alignment of the liquid crystal molecules 4a. Further, it is possible to form the polarizing layer 13 having a transmission axis in an axial direction of the linearly polarized light (i.e., having an absorption axis in a direction orthogonal to the axis of the linearly polarized light).

That is, the uniaxial treatment to the polarizing layer 13 can also be used as the alignment treatment of the azimuth angle of the liquid crystal 4. Thus, it is possible to form the polarizing layer 13 having an alignment axis in the same direction of the transmission axis, and possible to use the polarizing layer 13 as an alignment film. Further, the direction of the transmission axis of the polarizing layer 13 and the direction of the alignment axis (i.e., the direction of alignment of the liquid crystal molecules 4a which are aligned by the polarizing layer 13 serving as an alignment layer) are exactly the same. This enables the polarization axis of the polarizing layer 13 and the alignment axis of the liquid crystal molecules 4a to exactly align with each other, thereby preventing occurrence of leakage of light at the time of no voltage application.

Example azo-based compounds which can be used as an anisotropic absorber (an anisotropic absorbing pigment) are shown below.

[Chemical Formula 1]
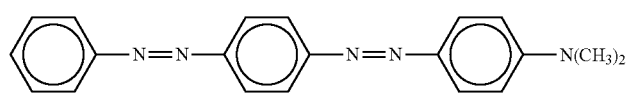
a
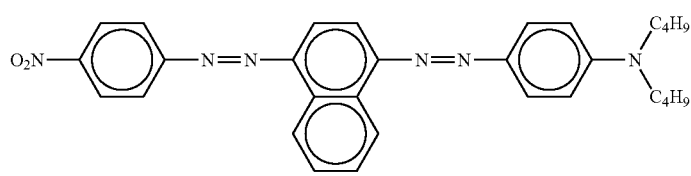
b
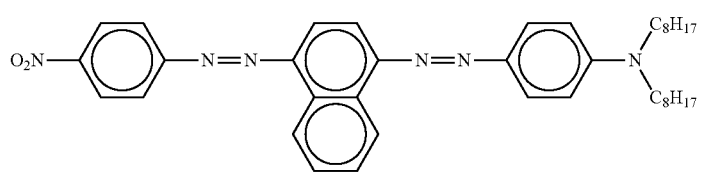
c
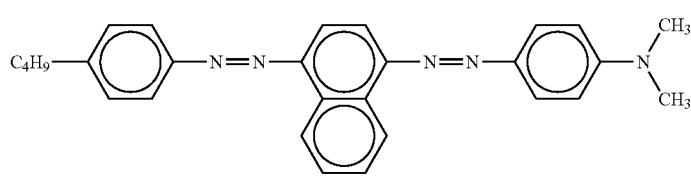
d
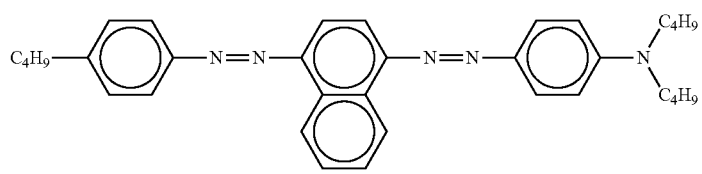
e
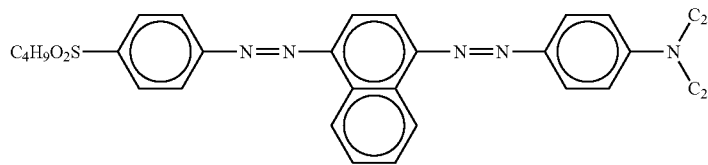
f
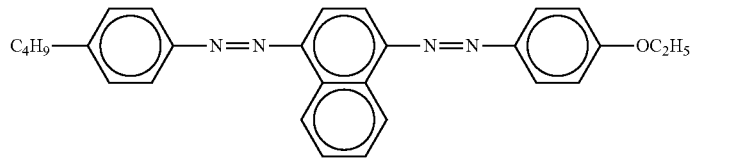
g
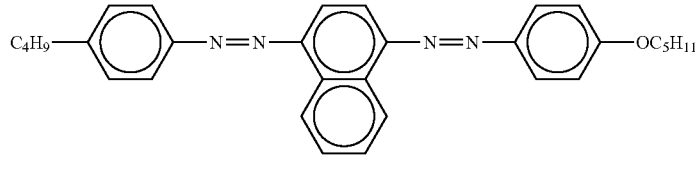
h
[Chemical Formula 2]
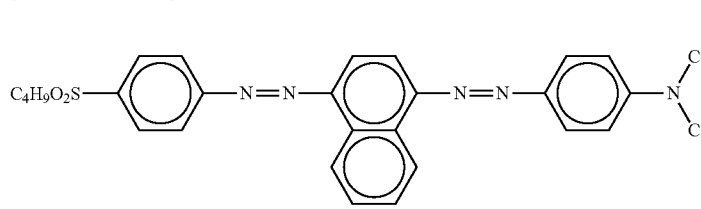
i -continued
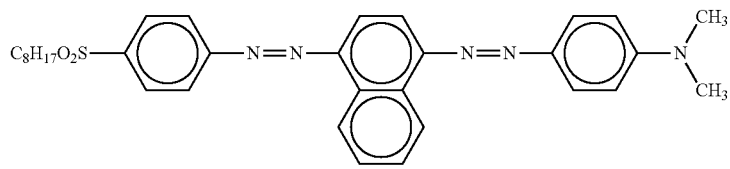 j
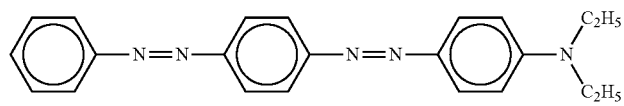 k
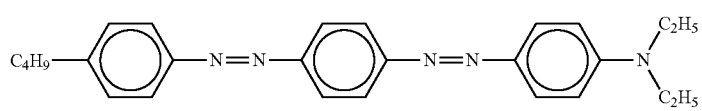 l
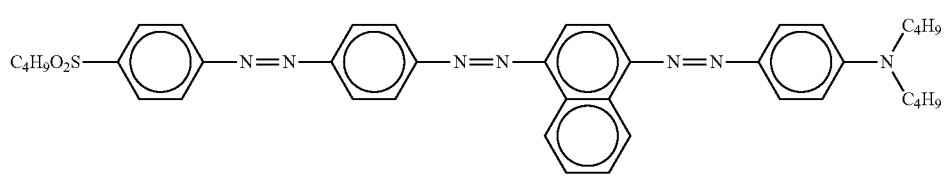 m
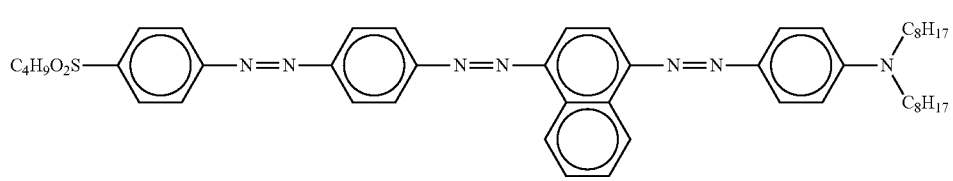 n
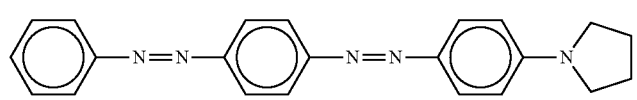 o
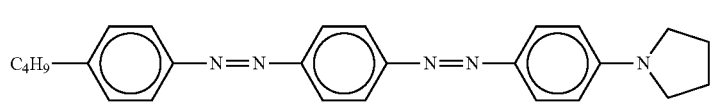 p
Further, an example anthraquinone-based compound which can be used as an anisotropic absorber (an anisotropic absorbing pigment) is shown below.
[Chemical Formula 3]
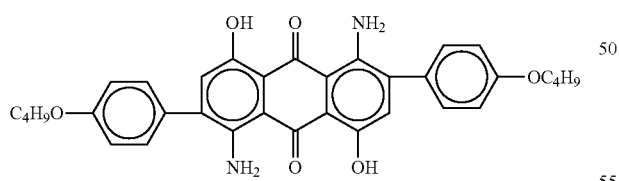 q
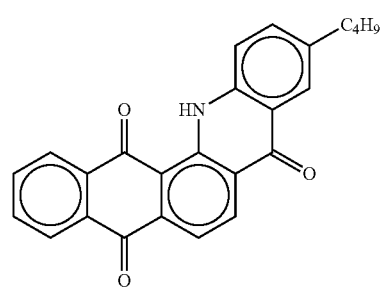 r
-continued
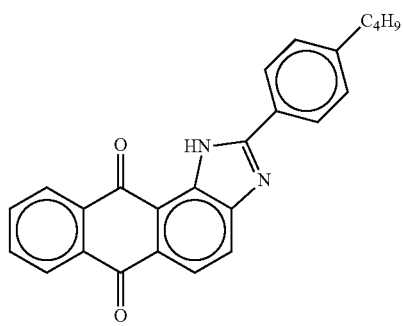 s
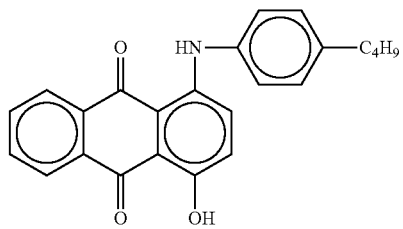 t -continued

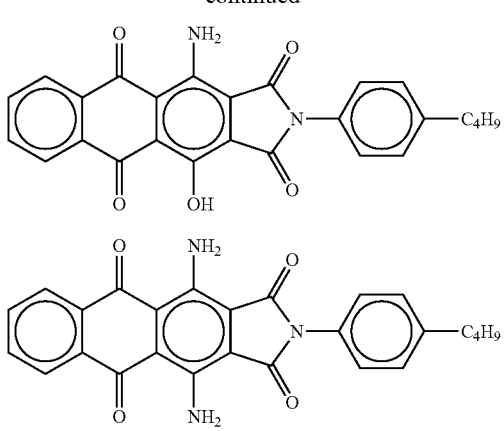

u v

According to the present embodiment, the polarizing layer 13 is provided on the color filter layer 11. Thus, the polarizing layer 13 serves as an overcoat layer for planarizing a surface layer of the second substrate 3.

Figure 3:
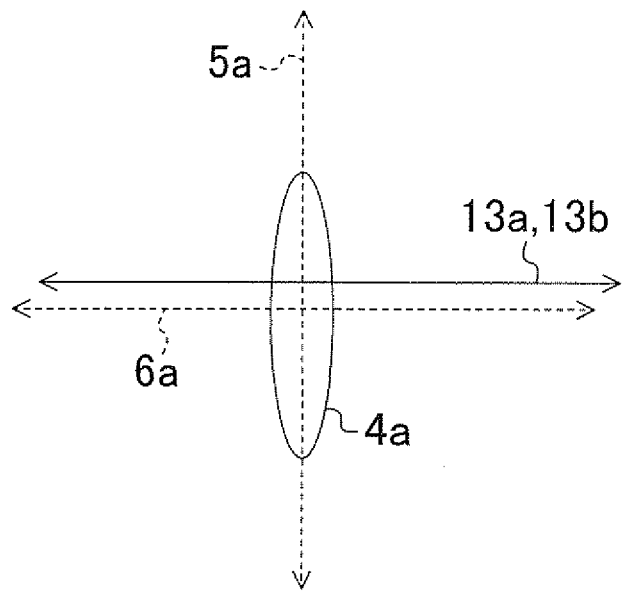
FIG. 3 is a schematic view for explaining optical characteristics at the time of no voltage application in the liquid crystal display device according to the first embodiment of the present invention.
Figure 4:
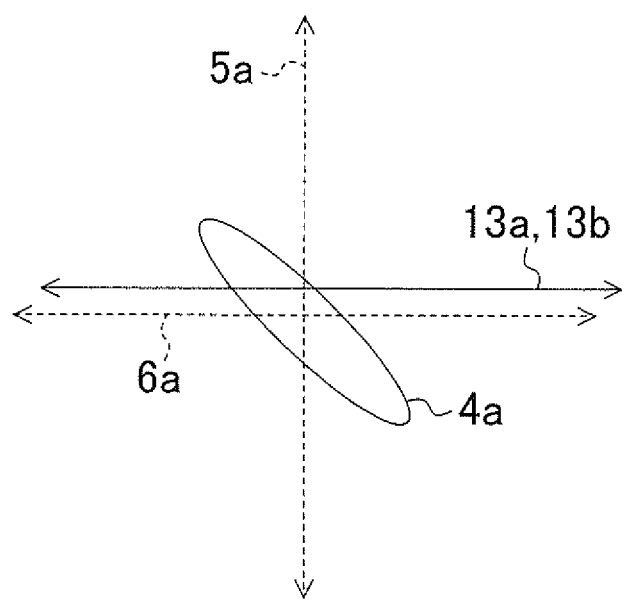
FIG. 4 is a drawing for explaining optical characteristics at the time of voltage application in the liquid crystal display device according to the first embodiment of the present invention.

Next, operation of the liquid crystal display device 1 of the present embodiment will be described. FIG. 3 is a schematic view for explaining the optical characteristics of a liquid crystal display device according to the first embodiment of the present invention at the time of no voltage application. FIG. 4 is a drawing for explaining the optical characteristics of a liquid crystal display device according to the first embodiment of the present invention at the time of voltage application.

In the present embodiment, as shown in FIG. 3, the transmission axis 5a of the first polarizing plate 5 and the direction of alignment of the liquid crystal molecule 4a are parallel to each other in the state in which no voltage at all is applied. Further, as shown in FIG. 3, the transmission axis 6a of the second polarizing plate 6 and the transmission axis 13a of the polarizing layer 13 are in the same direction (in parallel) in the state in which no voltage at all is applied. Further, the transmission axis 13a of the polarizing layer 13 and the transmission axis 6a of the second polarizing plate 6 are orthogonal to the transmission axis 5a of the first polarizing plate 5.

Further, for the sake of easy description, the angles of the transmission axis 6a of the second polarizing plate 6 and the transmission axis 13a of the polarizing layer 13 are regarded as 0°, and the angle of the transmission axis 5a of the first polarizing plate 5 is regarded as 90°. The transmission axis 13a of the polarizing layer 13 can serve as an alignment axis 13b.

If a back light unit is turned on when no voltage is applied, the light emitted from the back light unit passes through the first polarizing plate 5 and becomes linearly polarized light (90°), and the linearly polarized light (90°) passes through the liquid crystal layer 4. Thus, the linearly polarized light (90°) cannot pass through the polarizing layer 13 (0°) and the second polarizing plate (0°), and is blocked by the polarizing layer 13 and the second polarizing plate 6 to become a black representation.

On the other hand, if a voltage is applied between the pixel electrode 9 and the common electrode 7, and an in-plane electric field parallel to the substrate surfaces of the first substrate 2 and the second substrate 3 is generated between the pixel electrode 9 and the common electrode 7, then due to the generated in-plane electric field, the direction of the liquid crystal molecules 4a in the liquid crystal layer 4 rotates within a plane parallel to the substrate surfaces of the first substrate 2 and the second substrate 3, and is tilted from the 0° or 90° direction as shown in FIG. 4. The luminance is maximized when the direction of alignment of the liquid crystal molecules 4a rotates and forms an angle of 45° with respect to the transmission axes of the first polarizing plate 5, the second polarizing plate 6, and the polarizing layer 13.

Thus, the light emitted from the back light unit passes through the first polarizing plate 5 and becomes linearly polarized light (90°). Due to birefringence of the liquid crystal molecules 4a, a phase difference of λ/2 is given to the linearly polarized light (90°) having passed through the first polarizing plate 5 in the liquid crystal layer 4, and thereby the polarization plane rotates 90°. That is, the linearly polarized light (90°) having passed through the first polarizing plate 5 passes through the liquid crystal layer 4, and becomes linearly polarized light having a polarization axis of 0°. Since the linearly polarized light (0°) can pass through the polarizing layer 13 (0°) and the second polarizing plate (0°), the linearly polarized light (0°) can pass through the polarizing layer 13 and the second polarizing plate 6, and becomes a white representation.

As described above, it is possible to obtain an FFS mode liquid crystal display device 1 providing a black representation at the time of no voltage application, and providing a white representation at the time of voltage application.

According to the present embodiment described above, the following effects can be obtained.

(1) In the present embodiment, the polarizing layer 13 is provided on the liquid crystal layer 4 side of the second substrate 3 so as to be in contact with the liquid crystal layer 4. The polarizing layer 13 has a uniaxial absorption anisotropy, and serves as an alignment layer for regulating the direction of alignment of the liquid crystal molecules 4a. That is, since the polarizing layer 13 having a uniaxial absorption anisotropy is configured to be in contact with the liquid crystal layer 4 and serve as an alignment layer, the direction of the transmission axis 13a of the polarizing layer 13 and the direction of the alignment axis 13b can be exactly the same. Thus, the polarization axis of the polarizing layer 13 and the alignment axis of the liquid crystal molecules 4a are in exactly the same direction, making it possible to prevent the occurrence of leakage of light at the time of no voltage application. As a result, it is possible to prevent a reduction in contrast ratio.

(2) Further, since the polarizing layer 13 serves as an alignment layer, it is not necessary to provide an alignment layer in addition to the polarizing layer 13. Thus, the structure of the liquid crystal display device 1 can be simplified, and it is possible to provide the polarizing layer 13 without an increase in the number of fabrication steps. As a result, it is possible to prevent a cost increase.

(3) In the present embodiment, a polarizing layer serves as an overcoat layer for planarizing a surface layer of the second substrate 3. Thus, it is possible to use an unpolished second substrate 3 having undulations in the form of asperities on the surface. Accordingly, a work process for the second substrate 3 is not necessary. As a result, it is possible to reduce the number of fabrication steps and reduce cost.

(4) In the present embodiment, the polarizing layer 13 contains anisotropic absorbers, and the anisotropic absorbers are aligned in one direction by irradiation with linearly polarized light. Thus, it is possible to form the polarizing layer 13 in a simple structure which has a uniaxial absorption anisotropy and which can serve as an alignment layer.

(5) In the present embodiment, an azo-based compound or an anthraquinone-based compound can be used as the anisotropic absorber. Thus, it is possible to form the polarizing layer 13 which has a uniaxial absorption anisotropy and which can serve as an alignment layer, using a cheap, general-purpose compound.

(6) In the present embodiment, the glass transition temperature of the polarizing layer 13 is set to 200° C. or more. Thus, it is possible to prevent occurrence of image sticking caused by a change in the direction of alignment of the liquid crystal molecules 4a aligned by the polarizing layer 13 which serves as an alignment layer.

(7) In the present embodiment, the polymer forming the polarizing layer 13 is one selected from a group consisting of a polyimide-based resin, a polyamic acid imide-based resin, a polyimidesiloxane-based resin, and a polyamidimide-based resin. Thus, it is possible to form the polarizing layer 13 which has a uniaxial absorption anisotropy and which serves as an alignment layer, using a cheap, general-purpose resin material.

(8) In the present embodiment, the weight average molecular weight of the polymer forming the polarizing layer 13 is set to 10000 or more and 300000 or less. Thus, the glass transition temperature of the polarizing layer 13 can be sufficiently increased without causing any problems such as difficulty in depositing the polarizing layer 13 and difficulty in uniaxially aligning the anisotropic absorbers.

(9) In the present embodiment, the molecular weight distribution of the polymer forming the polarizing layer 13 is set to 2 or less. Thus, unevenness of the thickness of the polarizing layer 13 can be effectively prevented when the polarizing layer 13 is formed.

Second Embodiment

Figure 5:
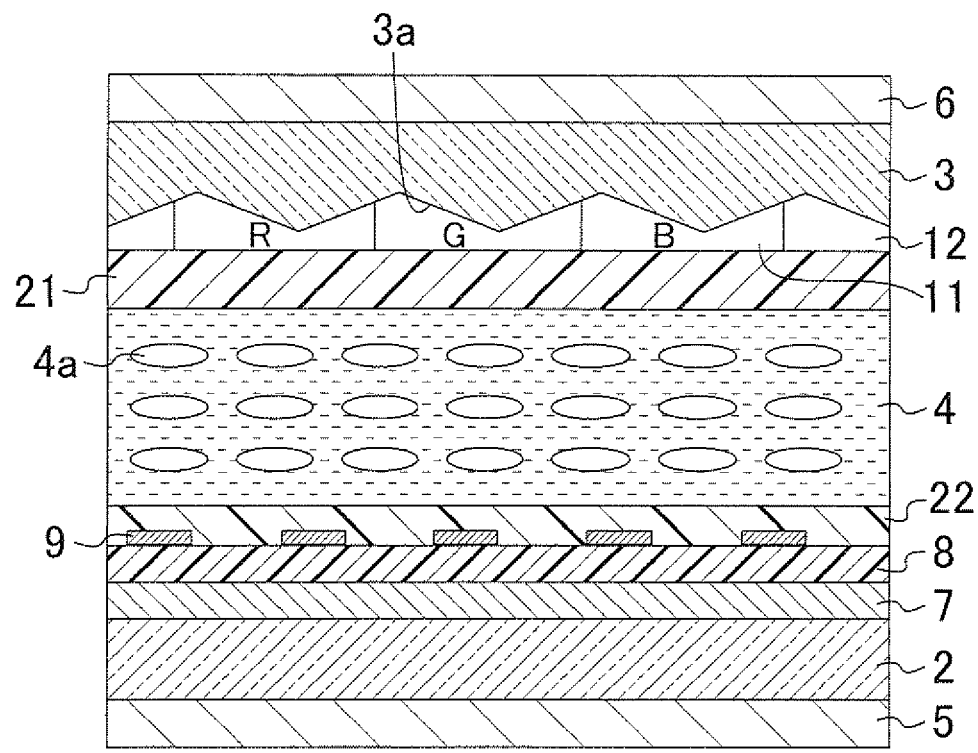
FIG. 5 is a cross section of a liquid crystal display device according to the second embodiment of the present invention.

Next, the second embodiment of the present invention will be described. FIG. 5 is a cross section of a liquid crystal display device according to the second embodiment of the present invention. The structural elements similar to those in the first embodiment are labeled with the same reference characters, and the descriptions thereof are omitted. In the present embodiment, as well, an FFS mode liquid crystal display device is used as an example of the liquid crystal display device.

In the present embodiment, as shown in FIG. 5, the polarizing layer 13 described in the first embodiment is replaced with a polarizing layer 21 made of an acrylic polymer obtained by polymerizing a bifunctional acrylic monomer. Further, the alignment layer 10 described in the first embodiment is replaced with an alignment layer 22 for regulating the direction of alignment of the liquid crystal molecules 4a.

Like the polarizing layer 13, the polarizing layer 21 is provided on the liquid crystal layer 4 side of the second substrate 3. The polarizing layer 21 has a uniaxial absorption anisotropy, and serves as an alignment layer for regulating the direction of alignment of the liquid crystal molecules 4a. As shown in FIG. 5, the polarizing layer 21 is provided between the liquid crystal layer 4 and the color filter layer 11, and is in contact with the liquid crystal layer 4. Further, like the polarizing layer 13, the polarizing layer 21 serves as an overcoat layer for planarizing the surface layer of the second substrate 3.

The polarizing layer 21 includes a polymer thin film made of a polymer, and an anisotropic absorber (an anisotropic absorbing pigment) contained in the polymer thin film.

In the present embodiment, an acrylic polymer obtained by polymerizing a bifunctional acrylic monomer is used as the polymer forming the polymer thin film.

Here, the reason why the bifunctional acrylic monomer is used is because if the bifunctional acrylic monomer is used, the acrylic polymer obtained by polymerization is also bifunctional, and therefore, it is possible to prevent variations in direction of alignment of the liquid crystal molecules 4a, and possible to prevent the liquid crystal molecules 4a from having a tilt angle of larger than 0°.

Further, the bifunctional acrylic polymer is used because the glass transition temperature of the bifunctional acrylic polymer is higher than the glass transition temperature of a monofunctional acrylic polymer, and therefore superior in long term stability.

This acrylic polymer can be obtained by a polymerization reaction under a temperature of 50° C. to 110° C. in a solvent in which a bifunctional acrylic monomer and a photo-polymerization initiator coexists. Here, in the present embodiment, like the above-described polarizing layer 13, the acrylic monomer is selected so that the glass transition temperature of the polarizing layer 21 (i.e., a polymer thin film) made of the acrylic polymer is 200° C. or more (preferably, 300° C. or more) to prevent the occurrence of image sticking.

In the present embodiment, a bifunctional monomer expressed by the following general formula (1) can be used as a acrylic monomer.

[Chemical Formula 4]

$$P^1—S^1-A^1-(Z^1-A^2)n-S^2—P^2 \quad (1)$$

(Here, $P^1$ and $P^2$ independently represent any one of an acrylate group, a methacrylate group, an acrylamide group, a methacrylamide group, a vinyl group, a vinyloxy group or an epoxy group. $A^1$ and $A^2$ independently represent any one of a straight-chain or cyclic alkyl of 4-40 carbons which can be substituted with H, halogen, or methyl group, a 1,4-phenylene group, a naphthalene-2,6-diyl group, or an anthracene2,6-diyl group. Further, $Z^1$ represents any one of O, COO or OCO. $S^1$ and $S^3$ independently represent —$(CH_2)_m$— or —$(CH_2—CH_2—O)m$-, where m represents integers of 1 to 6. Further, n represents integers of 0 to 2.)

In the above general formula (1), $A^1$ and $A^2$, or $A^2$ and $A^2$ may be directly coupled. $P^1$ and $A^1$, $A^1$ and $P^2$, or $A^2$ and $P^2$ may be directly coupled. A hydrogen group (H) may be substituted with a fluorine group (F).

Further, as the photo-polymerization initiator used in the present embodiment, known materials such as a benzophenone-based compound, an acetophenone-based compound, a thioxanthone-based compound, an imidazole-based compound, a benzothiazole-based compound, a benzoxazole-based compound, a triazine-based compound, and phosphorus-based compound, or an inorganic photo-polymerization initiator such as titanate.

Further, in the present embodiment, as an anisotropic absorber (an anisotropic absorbing pigment) contained in the polymer thin film funning the polarizing layer 21, the materials similar to those mentioned in the first embodiment can be used.

Then, the acrylic monomer containing the anisotropic absorber is irradiated with linearly polarized ultraviolet light to polymerize the acrylic monomer and make the anisotropic absorber align in one direction, thereby making it possible to form the polarizing layer 21 which serves as an alignment layer for regulating the direction of alignment of the liquid crystal molecules 4a and which has a transmission axis in an axial direction of the linearly polarized light (i.e., which has an absorption axis in a direction orthogonal to the axis of the linearly polarized light).

That is, the uniaxial treatment to the polarizing layer 21 can also be used as the alignment treatment of the azimuth angle of the liquid crystal 4. Thus, it is possible to form the polarizing layer 21 having an alignment axis in the same direction of the transmission axis, and possible to use the polarizing layer 21 as an alignment film. Further, the direction of the transmission axis of the polarizing layer 21 and the direction of the alignment axis (i.e., the direction of alignment of the liquid crystal molecules 4a which are aligned by the polarizing layer 21 serving as an alignment layer) are exactly the same. This enables the polarization axis of the polarizing layer 21 and the alignment axis of the liquid crystal molecules 4a to exactly align with each other, thereby preventing occurrence of leakage of light at the time of no voltage application.

The alignment layer 22 is provided on the pixel electrode 9 and the insulating film 8. The alignment layer 22 is made of a polymer thin film formed of a polymer that is similar to the above-described polymer forming the polarizing layer 13, and like the polarizing layer 13, the glass transition temperature is set to 200° C. or more to prevent the occurrence of the image sticking. Further, the alignment layer 22 is an alignment film capable of aligning liquid crystals due to rubbing treatment.

Figure 6:
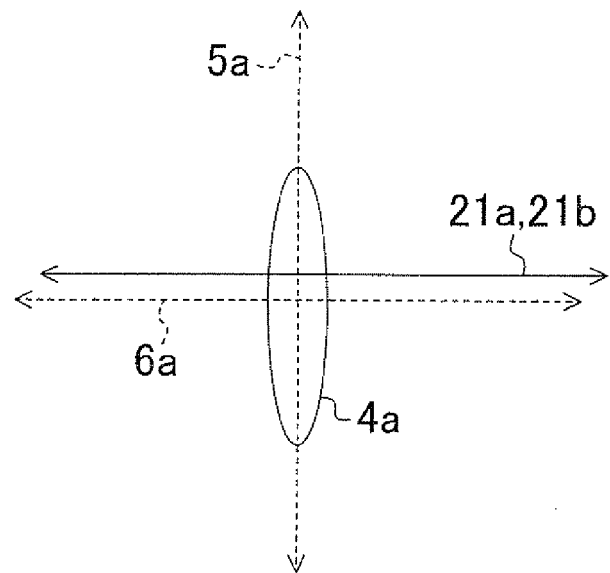
FIG. 6 is a schematic view for explaining optical characteristics at the time of no voltage application in the liquid crystal display device according to the second embodiment of the present invention.
Figure 7:
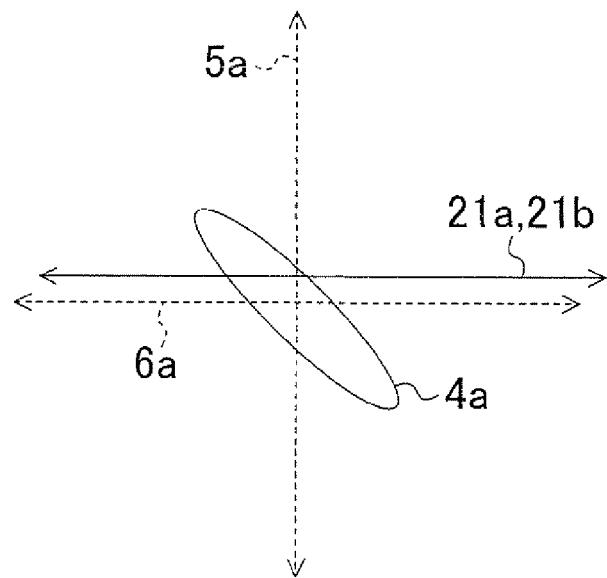
FIG. 7 is a drawing for explaining optical characteristics at the time of voltage application in the liquid crystal display device according to the second embodiment of the present invention.

Next, operation of the liquid crystal display device 20 of the present embodiment will be described. FIG. 6 is a schematic view for explaining the optical characteristics of a liquid crystal display device according to the second embodiment of the present invention at the time of no voltage application. FIG. 7 is a drawing for explaining the optical characteristics of the liquid crystal display device according to the second embodiment of the present invention at the time of voltage application.

The operation of the liquid crystal display device 20 according to the present embodiment is similar to the operation of the liquid crystal display device 1 according to the first embodiment.

Specifically, as shown in FIG. 6, the transmission axis 5a of the first polarizing plate 5 and the direction of alignment of the liquid crystal molecules 4a are parallel to each other in the state in which no voltage at all is applied. Further, as shown in FIG. 6, the transmission axis 6a of the second polarizing plate 6 and the transmission axis 21a of the polarizing layer 21 are in the same direction (in parallel) in the state in which no voltage at all is applied. Further, the transmission axis 21a of the polarizing layer 21 and the transmission axis 6a of the second polarizing plate 6 are orthogonal to the transmission axis 5a of the first polarizing plate 5.

Further, for the sake of easy description, the angle of the transmission axis 6a of the second polarizing plate 6 and the angle of the transmission axis 21a of the polarizing layer 21 are regarded as 0°, and the angle of the transmission axis 5a of the first polarizing plate 5 is regarded as 90°. The transmission axis 21a of the polarizing layer 21 can serve as an alignment axis 21b.

If a back light unit is turned on when no voltage is applied, the light emitted from the back light unit passes through the first polarizing plate 5 and becomes linearly polarized light (90°), and the linearly polarized light (90°) passes through the liquid crystal layer 4. Thus, the linearly polarized light (90°) cannot pass through the polarizing layer 21 (0°) and the second polarizing plate (0°), and is blocked by the polarizing layer 21 and the second polarizing plate 6 to become a black representation.

On the other hand, if a voltage is applied between the pixel electrode 9 and the common electrode 7, and an in-plane electric field parallel to the substrate surfaces of the first substrate 2 and the second substrate 3 is generated between the pixel electrode 9 and the common electrode 7, then due to the generated in-plane electric field, the direction of the liquid crystal molecules 4a in the liquid crystal layer 4 rotates within a plane parallel to the substrate surfaces of the first substrate 2 and the second substrate 3, and is tilted from the 0° or 90° direction as shown in FIG. 7.

Thus, the light emitted from the back light unit passes through the first polarizing plate 5 and becomes linearly polarized light (90°). Due to birefringence of the liquid crystal molecules 4a, a phase difference of λ/2 is given to the linearly polarized light (90°) having passed through the first polarizing plate 5 in the liquid crystal layer 4, and thereby the polarization plane rotates 90°. That is, the linearly polarized light (90°) having passed through first polarizing plate 5 passes through the liquid crystal layer 4, and becomes linearly polarized light having a polarization axis of 0°. Since the linearly polarized light (0°) can pass through the polarizing layer 21 (0°) and the second polarizing plate (0°), the linearly polarized light (0°) can pass through the polarizing layer 21 and the second polarizing plate 6 to become a white representation.

As described above, it is possible to obtain an FFS mode liquid crystal display device 1 providing a black representation at the time of no voltage application, and providing a white representation at the time of voltage application.

According to the present embodiment described above, the following effects can be obtained in addition to the effects (1) to (6) mentioned above.

(10) In the present embodiment, the polarizing layer 21 is made of an acrylic polymer obtained by polymerizing a bifunctional acrylic monomer. Since the acrylic polymer forming the polarizing layer 21 is bifunctional, it is possible to prevent variations in direction of alignment of the liquid crystal molecules 4a, and to prevent a reduction in contrast ratio. Further, it is possible to prevent the liquid crystal molecules from having a tilt angle of larger than 0°. Thus, a reduction in luminance can be avoided. Moreover, the glass transition temperature of the bifunctional acrylic polymer is higher than the glass transition temperature of the monofunctional acrylic polymer. Therefore, the bifunctional acrylic polymer is superior in long term stability. As a result, a reduction in contrast ratio and a reduction in luminance can be prevented.

Third Embodiment

Figure 8:
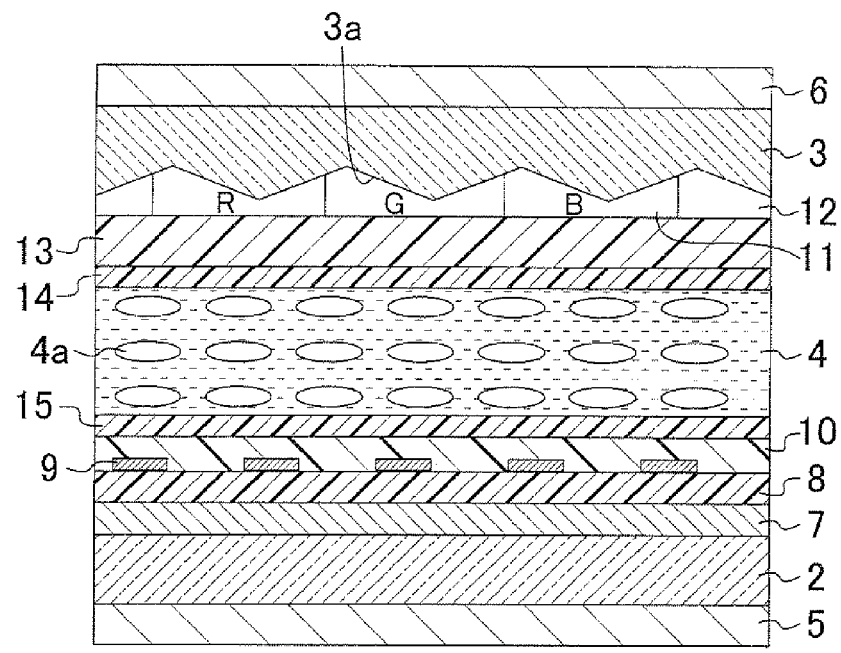
FIG. 8 is a cross section of a liquid crystal display device according to the third embodiment of the present invention.
Figure 9:
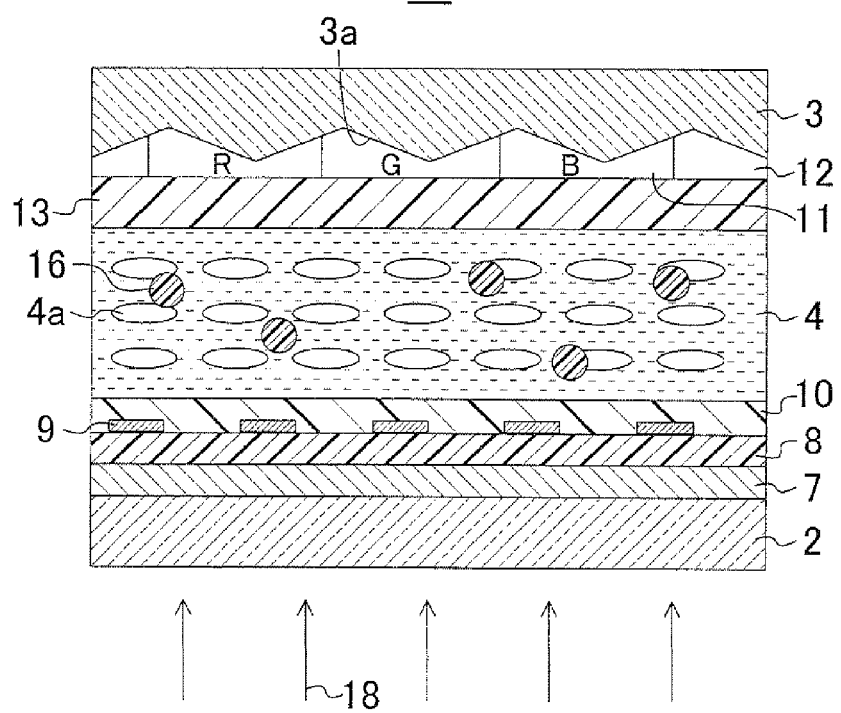
FIG. 9 is a cross section for explaining a method for forming an alignment maintaining layer of the liquid crystal display device according to the third embodiment of the present invention.

Next, the third embodiment of the present invention will be described. FIG. 8 is a cross section of a liquid crystal display device according to the third embodiment of the present invention. The structural elements similar to those in the first embodiment are labeled with the same reference characters, and the descriptions thereof are omitted. Also, the operation of the liquid crystal display device is the same as the operation of the liquid crystal display device of the first embodiment, and therefore, descriptions thereof are omitted. In the present embodiment, as well, an FFS mode liquid crystal display device is used as an example of the liquid crystal display device.

As shown in FIG. 8, a liquid crystal display device 30 according to the present embodiment is characterized by the provision of alignment maintaining layers 14, 15 for maintaining the alignment of the liquid crystal molecules 4a in the liquid crystal layer 4.

As shown in FIG. 8, the alignment maintaining layers 14, 15 are provided on the surface of the first substrate 2 side of the liquid crystal layer 4 and on the surface of the second substrate 3 side of the liquid crystal layer 4. More specifically, the alignment maintaining layer 14 is provided between the liquid crystal layer 4 and the polarizing layer 13, and the alignment maintaining layer 15 is provided between the liquid crystal layer 4 and the alignment layer 10.

Further, the alignment maintaining layers 14, 15 are made of a polymer. For example, a polymer of the monomer shown in [Chemical Formula 4] (1) can be used as this polymer.

Further, the alignment maintaining layers 14, 15 are formed by the following method: In the liquid crystal display panel 40 before provision of the first and second polarizing plates 5, 6, a polymerizable monomer 16 that will be a polymer by application of ultraviolet light or heat and a polymerization initiator are mixed together in the liquid crystal layer 4, and the liquid crystal layer 4 is irradiated with ultraviolet light 18 (or is subjected to a heat treatment) to polymerize the polymerizable monomer 16 in the liquid crystal layer 4, and thereby the alignment maintaining layers 14, 15 are formed.

The polymerizable monomer 16 is not specifically limited as long as a polymer can be formed by a polymerization reaction. Examples of the polymerizable monomer 16 includes a photo-curable resin monomer in which a polymerization reaction is caused by irradiation of light, such as ultraviolet light, a thermosetting resin monomer in which a polymerization reaction is caused by a heat treatment, etc. In the present embodiment, for example, the monomer shown in the [Chemical Formula 4] (1) can be used as the polymerizable monomer.

According to the present embodiment described above, the following effects can be obtained in addition to the above effects (1) to (9).

(11) In the present embodiment, the alignment maintaining layers 14, 15 for maintaining alignment of the liquid crystal molecules 4a of the liquid crystal layer 4 are provided. Therefore, the alignment of the liquid crystal molecules 4a can be maintained with reliability, and thus, the problem in which an initial azimuth angle gradually shifts due to an effect of the applied voltage does not occur.

(12) Further, the provision of the alignment maintaining layers 14, 15 can completely prevent the shift of the initial azimuth angle due to effects of the applied voltage. Thus, it is possible to significantly improve the durability of the liquid crystal display device 30.

EXAMPLES

The present invention will be described hereinafter based on examples and comparative examples. The present invention is not limited to these examples. These examples may be varied or modified within the spirit of the present invention, and the variations and modifications are not excluded from the scope of the present invention.

Example 1

First, p-phenylenediamine which is diamine, and pyromellitic dianhydride which is tetracarboxylic dianhydride were used as a monomer component. The p-phenylenediamine and the pyromellitic dianhydride were mixed in N-methylpyrrolidone, which is a solvent, in a molar ratio of 1:1 to form 5% by mass of polyamic acid by reaction under a room temperature. Then, the polyamic acid was deposited on the silicon substrate by spin coating, and was heated at 210° C. for 30 minutes to form a film-like polymer thin film having a thickness of 5 μm. After that, the glass transition temperature of the polymer thin film was measured by a dynamic viscoelasticity measuring apparatus (DMA). The glass transition temperature was 200° C. The imidization rate measured using an infrared absorption spectrum was 60% or more (and 90% or less).

Then, as the first substrate 2, a transparent glass substrate (a non-alkali glass substrate) which was surface-polished and having a thickness of 0.7 mm was prepared. A TFT as a switching element was formed on this glass substrate.

Then, an ITO film, for example, was formed by sputtering on the entire substrate on which the TFT was formed. After that, the ITO film was patterned by photolithography to form a common electrode 7 having a thickness of about 200 nm. The thickness of the common electrode 7 is preferably 50 to 600 nm.

Then, a silicon nitride film, for example, was formed by plasma CVD on the entire substrate on which the common electrode 7 was formed, thereby forming an insulating film 8 having a thickness of 250 nm. The thickness of the insulating film 8 is preferably 200 to 450 nm.

Then, an ITO film, for example, was formed by sputtering on the entire substrate on which the insulating film 8 was formed. After that, the ITO film was patterned by photolithography to form a pixel electrode 9 having a thickness of 200 nm and connected to the TFT through a contact hole (not shown) formed in the insulating film 8. The thickness of the pixel electrode 9 is preferably 50 to 600 nm.

Then, N-methylpyrrolidone solution in which the above polyamic acid was dissolved was applied to the entire substrate on which the pixel electrode 9 was formed, and thereafter calcinated at 90° C. for 5 minutes. After that, a heat treatment was performed at 210° C. for 30 minutes to form an alignment layer 10 of a thickness of 70 nm made of a polyimide resin. The thickness of the alignment film 10 is preferably 30 to 100 nm. Then, the substrate was heated on a hot plate to 50° C., and in this state, the first substrate 2 was irradiated with linearly polarized light (ultraviolet light) at 1 J/cm$^2$ from directly above the first substrate 2, using an extra-high pressure mercury lamp, thereby performing an alignment treatment. A high pressure mercury lamp or a xenon lamp may be used instead of the extra-high pressure mercury lamp.

As the second substrate 3, a glass substrate (a non-alkali glass substrate) which was not surface-polished and having a thickness of 0.7 mm was prepared.

Then, a positive photosensitive resin in which black pigments, such as carbon fine particles, were dispersed was applied to the entire glass substrate by spin coating. The applied photosensitive resin was exposed to light through a photomask, and then developed and heated, thereby forming a black matrix 12.

Subsequently, an acrylic photosensitive resin which was colored in red, green, or blue was applied onto the substrate on which the black matrix 12 was formed. The applied photosensitive resin was exposed to light through a photomask, and then developed for patterning, thereby forming a pigmented layer of a selected color (e.g., a red color layer R). Further, similar steps were repeated for the other two colors to form pigmented layers of the other two colors (e.g., a green color layer G and a blue color layer B), thereby forming a color filter layer 11 including the red color layer R, the green color layer G, and the blue color layer B.

Then, an azo-based compound shown in "a" of the above [Chemical Formula 1] which is an anisotropic absorber (an anisotropic absorbing pigment) was added in an N-methylpyrrolidone solution in which the above polyamic acid was dissolved, in an amount of 10 parts by mass with respect to 100 parts by mass of the polyamic acid.

The azo compound as an anisotropic absorber is added preferably in a range of from 5 parts by mass to 30 parts by mass, with respect to 100 parts by mass of a polyamic acid unit.

Then, the N-methylpyrrolidone solution which contains the above azo compound and in which a polyamic acid is dissolved, was applied by spin coating to the entire substrate on which the color filter layer 11 was formed, and thereafter calcinated at 90° C. for 5 minutes. After that, a heat treatment was performed at 210° C. for 30 minutes to form a polarizing layer 13 made of polyimide and having a thickness of 70 nm. The thickness of the polarizing layer 13 is preferably 30 to 100 nm. Then, the substrate was heated on a hot plate to 50° C., and in this state, the second substrate 3 was irradiated with linearly polarized light (ultraviolet light) at 1 J/cm$^2$ from directly above the second substrate 3, using an extra-high pressure mercury lamp, thereby performing an alignment treatment. A high pressure mercury lamp or a xenon lamp may be used instead of the extra-high pressure mercury lamp. As a result, the azo compounds as an anisotropic absorber contained in the polarizing layer 13 were aligned in one direction, and a polyimide film, i.e., the polarizing layer 13, which has a uniaxial absorption anisotropy and which serves as an alignment layer for regulating the direction of alignment of the liquid crystal molecules 4a, was formed.

A range of a heating temperature at the time of irradiation of the linearly polarized light is preferably in a range of between Tg−150 (° C.) and Tg (° C.), where Tg is a glass transition temperature, or more preferably in a range between 50° C. and 200° C. in the case where the glass transition temperature Tg is 200° C. This is because if the heating temperature is equal to or higher than the glass transition temperature Tg, sometimes it is difficult to control the alignment of the polymer thin film.

Next, these two substrates were faced to each other such that the alignment layer 10 which is capable of aligning liquid crystals and the surface to which the polarizing layer 13 was provided were faced to each other, and a sealing compound was applied to the peripheral portion, with spacers located therebetween at places spaced apart from one another, thereby assembling a liquid crystal display panel. The alignment directions of the alignment layer 10 and the polarizing layer 13 were parallel to each other, forming an angle of 10° with the direction of the applied in-plane electric field. This angle may be between 10° and 35° or between 55° and 80°.

Then, a nematic liquid crystal composite having a positive dielectric anisotropy of 10.2 (1 kH, 20° C.) (the positive dielectric anisotropy may be 8 or more) and a refractive index anisotropy of 0.075 (wavelength of 590 nm, 20° C.) was vacuum injected in the liquid crystal display panel, and the liquid crystal display panel was sealed with a sealing compound made of an ultraviolet curable resin. A liquid crystal display panel in which the liquid crystal layer 4 has a thickness of 4.8 μm (with a retardation (Δn·d) preferably in a range of from 360 nm to 500 nm) was formed in this way.

Then, two polarizing plates, i.e., first and second polarizing plates 5, 6 were attached to the obtained liquid crystal display panel. The two polarizing plates were placed such that the transmission axis 5a of the first polarizing plate 5 and the transmission axis 6a of the second polarizing plate 6 were orthogonal to each other, such that the transmission axis 5a of the first polarizing plate 5 and the direction of alignment of the liquid crystal molecules 4a were parallel to each other, and such that the transmission axis 6a of the second polarizing plate 6 and the transmission axis 13a (i.e., the alignment axis 13b) of the polarizing layer 13 were parallel to each other.

After that, a drive circuit, a back light unit, etc., were connected to configure a liquid crystal display module, thereby obtaining the liquid crystal display device 1 shown in FIG. 1.

Then, the display quality of the liquid crystal display device 1 was evaluated to find that the contrast ratio was 1000 or more on the almost entire substrate, and that the chromaticity difference Δu'v' between a black representation and a white representation was 0.033. Thus, the display quality was good. Further, the maximum luminance was 500 Cd/cm$^2$.

The contrast ratio, the chromaticity difference, and the maximum luminance did not change even after the liquid crystal display device 1 was operated for 1000 hours.

Example 2

In place of the alignment layer 10 of Example 1, an alignment layer 22 made of a polyimide resin similar to the polyimide resin of the alignment layer 10 and having a thickness of 70 nm (preferably 30 to 100 nm) was formed. After that, the alignment layer 22 was subjected to a rubbing treatment and an alignment treatment.

Further, a polarizing layer 21 was formed in place of the polarizing layer 13 of Example 1. More specifically, first, naphthalene-2,6-diyl-diacrylate that is a bifunctional acrylic monomer was used as a monomer component. Then, 5 parts by weight of this naphthalene-2,6-diyl-diacrylate was mixed in 95 parts by mass of N-methylpyrrolidone as a solvent to form an N-methylpyrrolidone solution in which a concentration of naphthalene-2,6-diyl-diacrylate was 5% by mass. Then, 10 parts by mass of the azo-based compound shown in "a" of the [Chemical Formula 1] which is an anisotropic absorber (an anisotropic absorbing pigment) with respect to 100 parts by mass of the naphthalene-2,6-diyl-diacrylate was mixed in a solution obtained by mixing, in the N-methylpyrrolidone solution, 0.5 parts by mass of Irgacure 651 (Benzil dimethyl ketal) which is a photo-polymerization initiator with respect to 100 parts by mass of naphthalene-2,6-diyl-diacrylate.

The amount of azo compound as an anisotropic absorber is preferably in a range between 5 parts by mass and 30 parts by mass with respect to 100 parts by mass of the acrylic monomer.

Then, an N-methylpyrrolidone solution which contains the above azo compound and in which an acrylic monomer is dissolved was applied by spin coating to the entire substrate on which a color filter layer 11 was provided, thereby forming a coating film having a thickness of 70 nm (preferably a thickness of 30 to 100 nm), and then, calcination was performed at 90° C. for 5 minutes. After that, the second substrate 3 was irradiated with linearly polarized light (ultraviolet light) at 5 J/cm$^2$ from directly above the second substrate 3, thereby performing a polymerization treatment of the acrylic monomer and an alignment treatment at the same time. As a result, the azo compounds, i.e., an anisotropic absorber, which is made of an acrylic polymer were aligned in one direction, and thereby, a polarizing layer 21 having a uniaxial absorption anisotropy and serving as an alignment layer for regulating the direction of alignment of the liquid crystal molecules 4a was formed in a thickness of 70 nm (preferably in a thickness of 30 to 100 nm).

A heat treatment (at 100° C. or lower) may be performed at the time of irradiation of the linearly polarized light. Such a heat treatment expedites a polymerization reaction of the acrylic monomer, and can reduce an amount of irradiation of the linearly polarized light to 5 J/cm$^2$ or less.

Further, a heat treatment was performed at 200° C. for 60 minutes after the irradiation of the linearly polarized light to avoid unreacted functional groups of the acrylic monomer and provide complete polymerization reaction.

Then, the glass transition temperature of the polarizing layer 21 was measured using a dynamic viscoelasticity measuring apparatus (DMA). The glass transition temperature of the polarizing layer 21 was 220° C.

Other than that described above, the structures of the liquid crystal display device 20 shown in FIG. 5 were the same as those in Example 1.

Next, the display quality of the liquid crystal display device 20 was evaluated as in Example 1 to find that the contrast ratio was 1000 or more on the almost entire substrate, and that the chromaticity difference Δu'v' between a black representation and a white representation was 0.035. Thus, the display quality was good. Further, the maximum luminance was 500 Cd/cm².

The contrast ratio, the chromaticity difference, and the maximum luminance did not change even after the liquid crystal display device 20 was operated for 1000 hours.

Example 3

A material was prepared by mixing, in the nematic liquid crystal composite described in Example 1, 0.5 parts by mass of naphthalene-2,6-diyl-diacrylate which is a polymerizable monomer and 0.5 parts by mass of Irgacure 651 (Benzil dimethyl ketal) which is a polymerization initiator with respect to 100 parts by mass of a monomer. This nematic liquid crystal composite was vacuum injected to form a liquid crystal display panel in which the liquid crystal layer 4 has a thickness of 4.8 μm. After that, the liquid crystal display panel was irradiated with ultraviolet light 18 from the first substrate 2 side at 20 T/cm² (preferably in a range between 10 and 100 J/cm²) to polymerize the polymerizable monomer and form the alignment maintaining layers 14, 15. Except that, the structures of the liquid crystal display device 30 shown in FIG. 8 were the same as those in Example 1.

Next, the display quality of the liquid crystal display device 20 was evaluated as in Example 1 to find that the contrast ratio was 1000 or more on the almost entire substrate, and that the chromaticity difference Δu'v' between a black representation and a white representation was 0.034. Thus, the display quality was good. Further, the maximum luminance was 500 Cd/cm².

A change in an initial azimuth angle of the liquid crystal alignment was 0° even after a 1000 hour current test of the liquid crystal display device 30.

Comparative Example 1

Figure 10:
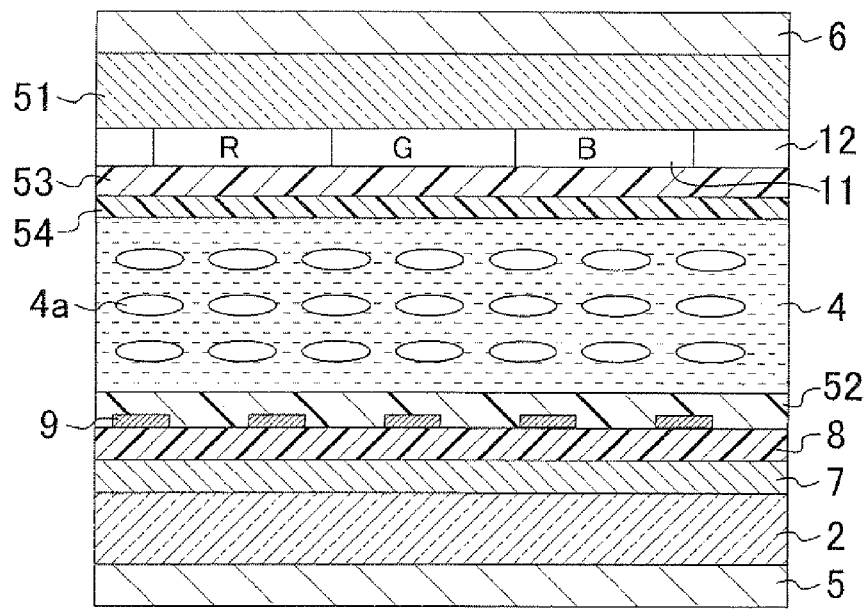
FIG. 10 is a cross section of a liquid crystal display device of Comparative Example 2.

In place of the second substrate 3 of Example 1, a transparent glass substrate (a non-alkali glass substrate) which was surface-polished and having a thickness of 0.7 mm was used as a second substrate 51. Further, in place of the alignment layer 10, an alignment layer 52 made of a polyimide similar to the polyimide forming the alignment layer 10 and having a thickness of 70 nm (preferably 30 to 100 nm) was formed. After that, the alignment layer 52 was subjected to a rubbing treatment and an alignment treatment. Further, in place of the polarizing layer 13, an overcoat layer 53 was formed by applying polyepoxy acrylate which is a photosensitive resin (polyvinyl alcohol, polyethylene-telephthalate, polyolefin, polyfluorene, polythiophene, polyphenylene, polyimide, polyamide, etc., can also be used) on the entire substrate on which a color filter layer 11 was provided, and thereafter irradiating the entire surface with light and providing thermal curing. Further, an alignment layer 54 similar to the alignment layer 52 was formed on the overcoat layer 53. Other than that described above, the structures of the liquid crystal display device 50 shown in FIG. 10 were the same as those in Example 1.

Next, the display quality of the liquid crystal display device 50 was evaluated as in Example 1 to find that the contrast ratio was 400 on the almost entire substrate, and that the chromaticity difference Δu'v' between a black representation and a white representation was 0.057. Thus, the display quality was inferior to the display quality in Example 1. Further, the maximum luminance was 500 Cd/cm².

Comparative Example 2

Figure 11:
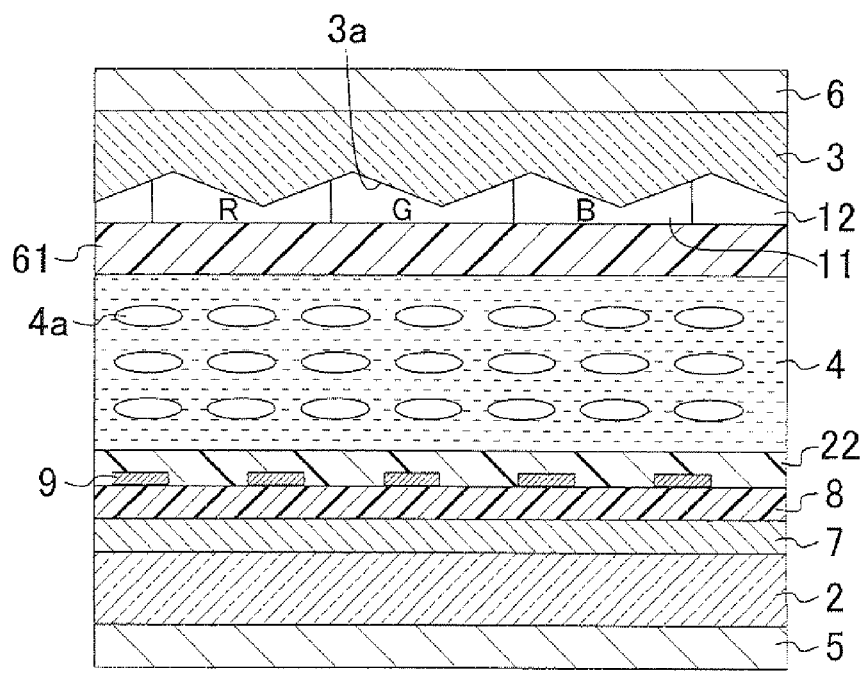
FIG. 11 is a cross section of a liquid crystal display device of Comparative Example 3.

In place of the bifunctional acrylic monomer of Example 2, Naphthalene-2-yl-acrylate which is a monofunctional acrylic monomer was used. In place of the polarizing layer 21 of Example 2, a polarizing layer 61 made of an acrylic polymer obtained by polymerizing a monofunctional acrylic monomer was formed. Except that, the structures of the liquid crystal display device 60 shown in FIG. 11 were the same as those in Example 2.

As a monofunctional acrylic monomer which can be used in Comparative Example 2, the monomer expressed by the following general formula (2) can be used.

[Chemical Formula 5]

(Here, $P^3$ independently represents any one of an acrylate group, a methacrylate group, an acrylamide group, a methacrylamide group, a vinyl group, a vinyloxy group, and an epoxy group. $S^3$ represents $—(CH_2)_m—$ or $—(CH_2—CH_2—O)m-$, where in represents integers of 1 to 6. Further, $A^3$ represents a straight-chain or cyclic alkyl of 4 to 40 carbons.)

In the above general formula (2), $P^3$ and $A^3$ may be directly coupled.

The glass transition temperature of the polarizing layer 61 was measured using a dynamic viscoelasticity measuring apparatus (DMA). The glass transition temperature was 120° C.

Then, the display quality of the liquid crystal display device 60 was evaluated as in Example 1 to find that the contrast ratio was 700 on the almost entire substrate, and that the chromaticity difference Δu'v' between a black representation and a white representation was 0.035. Thus, the display quality was inferior to the display quality in Example 2. Further, the maximum luminance was 400 Cd/cm², which is lower than the maximum luminance in Example 2.

This may be because the acrylic polymer forming the polarizing layer 61 is monofunctional, and therefore, the direction of alignment of the liquid crystal molecules 4a fluctuates at the portion where the side chain $A^3$ in the above general formula (2) is in contact with the liquid crystal layer 4 due to fluctuations of the side chain $A^3$, and thus, the contrast ratio is decreased.

Further, since the side chain $A^3$ is in contact with the liquid crystal molecules 4a, the liquid crystal molecules 4a have a tilt angle of larger than 0°. This may be the reason why the luminance is decreased.

Further, the glass transition temperature of the monofunctional acrylic polymer is lower than the glass transition temperature of the bifunctional acrylic polymer. Thus, the monofunctional acrylic polymer is not superior in long term stability, and consequently, the contrast ratio and the luminance may be decreased.

Further, the above embodiments may be changed as follows.

In the first to third embodiments, an FFS mode liquid crystal display device was described as an example liquid crystal display device. However, the present invention can be applied to an IPS mode liquid crystal display device, as well. Further, similar effects as the above effects (1) to (12) can be obtained also in the IPS mode liquid crystal display device to which the present invention is applied.

In the second embodiment, a polarizing layer 21 made of an acrylic polymer obtained by polymerizing a bifunctional acrylic monomer is provided. However, a polarizing layer made of a polymer having a linear structural unit (e.g., a carboxylic polymer having an epoxy acrylate as a base and a fluorene skeleton) may also be used.

Further, in the liquid crystal display device 30 shown in FIG. 8 and described in the third embodiment, the polarizing layer 13 may be replaced with the polarizing layer 21 made of an acrylic polymer obtained by polymerizing a bifunctional acrylic monomer as in the second embodiment. In this case, as well, a similar effect as the above effect (10) can be obtained.

INDUSTRIAL APPLICABILITY

As described above, the present invention is useful for a liquid crystal display device, and particularly suitable for an in-plane mode liquid crystal display device.

DESCRIPTION OF REFERENCE CHARACTERS

1, 20, 30 liquid crystal display device
2 first substrate
3 second substrate
4 liquid crystal layer
4a liquid crystal molecule
5 first polarizing plate
5a transmission axis of a first polarizing plate
6 second polarizing plate
6a transmission axis of a second polarizing plate
7 common electrode (first electrode)
8 insulating film
9 pixel electrode (second electrode)
13 polarizing layer
13a transmission axis of a polarizing layer
14 alignment maintaining layer
15 alignment maintaining layer
16 polymerizable monomer
21 polarizing layer
21a transmission axis of a polarizing layer

The invention claimed is:
1. A liquid crystal display device, comprising:
a first substrate;
a second substrate provided to face the first substrate;
a liquid crystal layer sandwiched between the first substrate and the second substrate;
a first polarizing plate and a second polarizing plate respectively provided on a side of the first substrate and a side of the second substrate which are opposed to sides to which the liquid crystal layer is provided; and
a first electrode and a second electrode provided to the liquid crystal layer side of the first substrate, wherein
an electric field parallel to substrate surfaces of the first and second substrates is applied to the liquid crystal layer by an electric field generated between the first electrode and the second electrode, thereby controlling alignment of liquid crystal molecules of the liquid crystal layer,
a polarizing layer is provided on the liquid crystal layer side of the second substrate so as to be in contact with the liquid crystal layer, and the polarizing layer has a uniaxial absorption anisotropy and serves as an alignment layer for regulating a direction of alignment of the liquid crystal molecules;
wherein a glass transition temperature of the polarizing layer is 200° C. or more;
an alignment maintaining layer for maintaining alignment of the liquid crystal molecules is provided between the polarizer layer and the liquid crystal layer;
wherein the alignment maintaining layer is made of a polymer of a following monomer:

[Chemical Formula 1]

$$P^1-S^1-A^1-(Z^1-A^2)n-S^2-P^2 \quad (1)$$

Where $P^1$ and $P^2$ independently represent any one of an acrylate group, a methacrylate group, an acrylamide group, a methacrylamide group, a vinyl group, a vinyloxy group or an epoxy group; $A^1$ and $A^2$ independently represent any one of a straight-chain or cyclic alkyl of 4-40 carbons which can be substituted with H, halogen, or methyl group, a 1,4-phenylene group, a naphthalene-2,6-diyl group, or an anthracene-2,6-diyl group, $Z^1$ represents any one of O, COO or OCO; $S^1$ and $S^3$ independently represent —$(CH_2)m$— or $(CH_2-CH_2-O)m$—; m represent integers of 1 to 6; and n represents integers of 0 to 2.

2. The liquid crystal display device of claim 1, wherein the polarizing layer is a photo alignment film formed by irradiation of polarized ultraviolet light.

* * * * *